United States Patent [19]

McMillen

[11] Patent Number: 4,592,849

[45] Date of Patent: Jun. 3, 1986

[54] METHOD FOR REMOVING WATER FROM PRODUCED CRUDE OIL

[75] Inventor: James M. McMillen, Arlington, Tex.

[73] Assignee: Mobil Oil Corporation, New York, N.Y.

[21] Appl. No.: 714,355

[22] Filed: Mar. 22, 1985

Related U.S. Application Data

[63] Continuation of Ser. No. 548,488, Nov. 3, 1983, abandoned.

[51] Int. Cl.$^4$ .................................................. B01D 17/022
[52] U.S. Cl. ........................................ 210/799; 210/804; 210/DIG. 5
[58] Field of Search ............... 210/663, 691, 693, 694, 210/799, 804, 807, 265, 500.1, DIG. 5, 689

[56] References Cited

U.S. PATENT DOCUMENTS

| | | | |
|---|---|---|---|
| 2,739,713 | 3/1956 | Robinson | 210/DIG. 5 |
| 3,491,882 | 1/1970 | Elam | 210/799 |
| 3,830,371 | 8/1974 | Garcia | 210/DIG. 5 |
| 3,847,821 | 11/1974 | Kreuger | 210/DIG. 5 |
| 3,972,816 | 8/1976 | Mail et al. | 210/DIG. 5 |
| 3,992,291 | 11/1976 | Hirs | 210/DIG. 5 |
| 4,243,528 | 1/1981 | Hubbard et al. | 210/DIG. 5 |
| 4,335,001 | 6/1982 | Aurelle et al. | 210/DIG. 5 |
| 4,493,772 | 1/1985 | Tanaka | 210/799 |

FOREIGN PATENT DOCUMENTS 257194  2/1913  Fed. Rep. of Germany .

*Primary Examiner*—Ivars Cintins
*Attorney, Agent, or Firm*—Alexander J. McKillop; Michael G. Gilman; Stanislaus Aksman

[57] ABSTRACT

A method for removing emulsified water from a produced crude oil stream containing up to 65 volume percent water wherein the water-in-produced crude oil emulsion is passed through a bed containing a water saturated coalescing media, preferably sand or crushed quartz whereby the water coalesces to form a water phase and an oil phase essentially free of water. The two phases are allowed to separate by gravity forming an upper crude oil phase containing less than 3 volume percent water, and can be less than one-half volume percent water.

8 Claims, No Drawings

METHOD FOR REMOVING WATER FROM PRODUCED CRUDE OIL

This is a continuation of copending application Ser. No. 548,488 filed on Nov. 3, 1983, now abandoned.

BACKGROUND AND FIELD OF THE INVENTION

1. Field of the Invention

This invention relates to a method for removing water from a produced crude oil stream containing droplets of water suspended therein in the form of an emulsion by passing the water-in-oil emulsion through a water saturated hydrophilic coalescing media such as sand or crushed quartz whereby the droplets of water are coalesced into a water phase which can be easily separated from the oil by gravity.

2. Background of the Invention

In oil fields, water usually is produced with crude oil. The crude oil must generally be free of water before it can be sold and transported in pipelines. The complexity of separating mixtures of water and oil depends upon the physical form of the water. Where the mixture has only "free" water, the water will separate readily from the oil because of the differences in gravities of the water and oil. This type of separation presents no problem other than providing a vessel in which water-oil phase separation can occur. However, the water can be dispersed throughout the oil in very minute particles, usually with diameters less than 25 microns. This mixture may be termed an emulsion and is very difficult to separate into water and oil phases.

The breaking of emulsions in which water is dispersed in the continuous crude oil phase requires performing certain functions. Initially, the interfacial protective film surrounding the dispersed water within the emulsion must be weakened or destroyed. Then, the particles of water must coalesce into droplets of water which can undergo settling through the effects of gravity. Thereafter, the coalesced droplets of water are separated a a water phase from the oil phase.

Breaking of emulsions may be achieved at considerable expense through the use of free water knockouts, chemical injection, heater treaters, chemical-electric treaters, and other similar equipment all of which are very expensive. Those methods which use heat are difficult and costly to maintain, as well as needing large quantities of fuel. Generally, the methods for breaking a water-in-oil emulsion usually employ a combination of these treatments. In many instances, chemical demulsifiers may be employed for assisting in the breaking of the protective film which surrounds the dispersed water. The demulsifiers are added to the emulsion to counteract the effects of the emulsifiers which provide the stability of the dispersed water particles in the continuous oil phase. The demulsifier is uniformly distributed throughout the emulsion so as to be present at all interfaces between the water and oil before the emulsion is processed in a treating facility.

A large part of the cost of oil production, both capital and expense, goes toward treating oil field emulsions. Water must be removed from the crude prior to selling or shipping it. Allowable water content varies from under one percent up to three percent. To reach these values, chemical plus heat treatments are normal, with dilution and electrical methods used with more difficult emulsions. Even more-difficult-to-break emulsions, as from in-situ combustion projects, may require a second-stage treatment similar to the first to reduce water content to that required for shipment or sales. Chemical costs run high; purchase and maintenance of heater treaters is expensive; much fuel is burned. Most producing areas incur these costs.

U.S. Pat. No. 3,489,680 describes a method for breaking a water-in-oil emulsion into water and oil phases using a hydrocyclone in conjunction with a hydrophilic coalescing membrane.

German Patent No. 257,194 issued Feb. 26, 1913, discloses a process for separating water from crude oil by mixing the water containing crude oil with sharp-grained materials such as sharp sand, fine splinters of glass, iron chips or the like. If necessary, heat and simultaneous use of an air stream as a stirring mechanism may be employed. Mixing may also occur in a heated filter filled with sharpgrained material.

The present invention provides an effective and economical method for removing water from a natural emulsion of reservoir water in produced reservoir crude oil by passing the emulsion through a water saturated hydrophilic coalescing media such as sand or crushed quartz whereby the water droplets are coalesced into a water phase capable of separation from the crude oil by gravity.

SUMMARY OF THE INVENTION

The present invention is a method for removing emulsified water from a crude oil stream produced from a subterranean, oil-containing formation, comprising passing the crude oil stream containing emulsified water through a bed containing a water saturated hydrophilic coalescing media whereby the water coalesces and a water phase and an oil phase substantially free of water are formed. The oil phase essentially free of water is separated by gravity from the water phase. The hydrophilic coalescing media include sand, crushed quartz, diatomaceous earth, porous silica, inert fibrous liners coated with substances which make the liners preferentially wetted by water in the presence of oil, fibrous webs formed of glass fibers, synthetic polymeric fibers, naturally occurring fibers, open pore foams, and ground walnut shells. The preferred coalescing media are sand or crushed quartz. The crude oil recovered contains less than 3 volume percent water, and can be as low as less than one-half volume percent water.

DESCRIPTION OF THE PREFERRED EMBODIMENTS

This invention provides a method for removing suspended droplets of water dispersed in a crude oil stream in the form of an emulsion obtained from production wells in a process for the recovery of oil from a subterranean oil reservoir.

A produced water-in-crude oil stream containing up to 65 volume percent water is passed through a vessel packed with a water saturated hydrophilic coalescing media which coalesces the droplets of water thereby forming an oil phase essentially free of water and a water phase. The effluent from the coalescing media is allowed to settle or can be centrifuged to separate the oil phase from the water phase. The oil phase contains less than 3 volume percent water and in some cases even less than one-half volume percent water.

Coalescence may occur as the result of shear, or by bringing the droplets in close proximity with each other or with the water wet quartz surface. Equilibrium is established very soon after oil breakthrough and water-in equals water-out shortly after oil first emerges from the coalescing bed. Suitable hydrophilic coalescing media include sand, crushed quartz, diatomaceous earth, ground walnut shells, open pore foams, inert fiberous liners coated with substances which make the liners preferentially wetted by water in the presence of oil, fibers formed of glass fibers, synthetic fibers, or naturally occurring fibers. The preferred hydrophilic coalescing media are water saturated sand or crushed quartz.

The contact of water-in-produced crude oil emulsion and the coalescing medium is preferably made wherein the coalescing medium is maintained as a fixed bed, although a moving bed or bath contacting may also be employed. The water-in-produced crude oil emulsion stream may pass over the coalescing medium in upflow, downflow or radial flow. It may be desirable to provide parallel coalescing beds so that one bed can be used while another is being regenerated. Series flow to promote maximum removal of water can also be used. Use of multiple beds in series flow with a parallel train is also possible. In those very-hard-to-treat emulsions, as from in-situ combustion, this method of reducing water content of water-in-oil emulsions can replace one or both of the often-used two stages of more conventional emulsion treatment facilities as previously described.

The amount of coalescing media required will vary depending upon the emulsion flow rate and the amount of water emulsified in the crude oil.

The following laboratory example serves to illustrate the process of the present invention.

EXAMPLE

A produced crude oil from Oklahoma containing about 14 percent emulsified water, an API gravity of 15°, and a 2700 cp viscosity at 77° F., was passed through a foot long pack containing a mixture of 92 percent #½ and eight percent #3/0 crushed quartz, packed wet in a cell containing seven percent brine (produced water from the field has a density equal to about seven percent brine). The effluent from the coalescing media was allowed to settle whereby the oil phase essentially free of water separated from the water phase by gravity. The oil phase was found to contain less than one weight percent water.

While a particular embodiment of the invention has been shown and described, various modifications are within the true spirit and scope of the invention. The appended claims are, therefore, intended to cover all such modifications.

What is claimed is:

1. A method for removing emulsified water from a crude oil stream produced from a subterranean, oil-containing formation, the oil stream containing about 14 to about 65% by volume of emulsified water consisting essentially of:
   (a) passing the crude oil stream containing emulsified water through a bed of a water-saturated hydrophilic coalescing medium selected from the group consisting of sand, crushed quartz, diatomaceous earth, porous silica and ground walnut shells, whereby the water coalesces and an oil phase, substantially free of water, and a water phase are formed; and
   (b) separating the oil phase containing less than 3 volume percent of water from the water phase by gravitational separation or centrifuging.

2. The method of claim 1 wherein the crude oil separated from the water during step (b) contains less than one-half volume percent water.

3. The method of claim 2 wherein the coalescing medium comprises water-saturated sand.

4. The method of claim 2 wherein the coalescing medium comprises water-saturated crushed quartz.

5. The method of claim 2 wherein the coalescing medium comprises water-saturated ground walnut shells.

6. The method of claim 1 wherein the coalescing medium comprises a mixture of 92% of No. ½ crushed quartz and 8% of No. 3/0 crushed quartz.

7. The method of claim 6 wherein the coalescing medium is saturated with a solution of 7% brine.

8. The method of claim 7 wherein the crude oil contains about 14% of emulsified water.

* * * * *